(12) United States Patent
King et al.

(10) Patent No.: US 9,832,157 B2
(45) Date of Patent: Nov. 28, 2017

(54) METHOD AND SYSTEM FOR PRESENTING EVENT NOTIFICATIONS IN A SOCIAL MEDIA ENVIRONMENT

(71) Applicant: ONYX WEBSITES LLC, Springville, UT (US)

(72) Inventors: Brian Robert King, Provo, UT (US); Mark Sean Roylance, Elk Ridge, UT (US); Milo Richard LeBaron, Lehi, UT (US); Fululele Duke Neria, Elk Ridge, UT (US)

(73) Assignee: ONYX WEBSITES LLC, Springville, UT (US)

( * ) Notice: Subject to any disclaimer, the term of this patent is extended or adjusted under 35 U.S.C. 154(b) by 202 days.

(21) Appl. No.: 13/833,298

(22) Filed: Mar. 15, 2013

(65) Prior Publication Data

US 2014/0280546 A1 Sep. 18, 2014
US 2016/0248717 A9 Aug. 25, 2016

Related U.S. Application Data

(60) Provisional application No. 61/706,508, filed on Sep. 27, 2012.

(51) Int. Cl.
*G06F 15/16* (2006.01)
*H04L 12/58* (2006.01)

(52) U.S. Cl.
CPC .............. *H04L 51/32* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 9,563,870 B1* | 2/2017 | Szmajda | ............ | G06Q 10/087 |
| 2008/0046316 A1* | 2/2008 | Shah | ................... | G06Q 30/02 |
| | | | | 705/14.43 |
| 2008/0059297 A1* | 3/2008 | Vallier et al. | .................. | 705/14 |
| 2009/0119167 A1* | 5/2009 | Kendall et al. | ................ | 705/14 |
| 2010/0010822 A1* | 1/2010 | Bal et al. | ......................... | 705/1 |
| 2010/0138037 A1* | 6/2010 | Adelberg | ............ | G06Q 10/087 |
| | | | | 700/241 |
| 2011/0191417 A1* | 8/2011 | Rathod | ................. | G06Q 30/02 |
| | | | | 709/204 |
| 2011/0218846 A1* | 9/2011 | Fieldman | .......... | G06Q 30/0214 |
| | | | | 705/14.16 |
| 2011/0246306 A1* | 10/2011 | Blackhurst | ............ | G06Q 30/02 |
| | | | | 705/14.58 |

(Continued)

*Primary Examiner* — Kenny Lin

(57) ABSTRACT

Embodiments of the present disclosure provide a method and system for providing notification of events. Specifically, embodiments disclosed herein describe a method and system for generating dynamic messages based on events and transmitting the dynamic messages to various users over a social networking platform. Embodiments include receiving product data and comparing the product data to a set of predefined trigger parameters. If it is determined that the product data satisfies one or more of the trigger parameters, a dynamic message is generated. In certain embodiments, the content of the dynamic message is based, at least in part, on the product data. The generated dynamic message is then automatically transmitted to a set of recipients over the social networking platform.

20 Claims, 4 Drawing Sheets

(56) References Cited

U.S. PATENT DOCUMENTS

| | | | |
|---|---|---|---|
| 2011/0251879 A1* | 10/2011 | Lambert | G06Q 30/02 705/14.13 |
| 2011/0258050 A1* | 10/2011 | Chan et al. | 705/14.66 |
| 2011/0270685 A1* | 11/2011 | Marks et al. | 705/14.66 |
| 2012/0036018 A1* | 2/2012 | Feliciano et al. | 705/14.66 |
| 2012/0089480 A1* | 4/2012 | Fusz | G06Q 30/06 705/26.41 |
| 2012/0158501 A1* | 6/2012 | Zhang et al. | 705/14.53 |
| 2012/0246010 A1* | 9/2012 | Foth et al. | 705/14.66 |
| 2012/0278167 A1* | 11/2012 | Schwartz | 705/14.53 |
| 2013/0046654 A1* | 2/2013 | Killoran | 705/26.8 |
| 2013/0332290 A1* | 12/2013 | Medrano | G06Q 30/02 705/14.73 |
| 2014/0032376 A1* | 1/2014 | Tyagi | G06Q 30/0601 705/27.1 |
| 2014/0136995 A1* | 5/2014 | Matas | 715/753 |
| 2014/0229330 A1* | 8/2014 | Flores | 705/26.41 |

* cited by examiner

METHOD AND SYSTEM FOR PRESENTING EVENT NOTIFICATIONS IN A SOCIAL MEDIA ENVIRONMENT

CROSS-REFERENCE TO RELATED APPLICATIONS

The present application claims priority to U.S. Provisional Application No. 61/706,508 filed on Sep. 27, 2012 entitled Method and System for Presenting Event Notifications, the aforementioned application being incorporated by reference in its entirety.

BACKGROUND

In the recent past, social media platforms have become increasingly popular. Due to the popularity of these platforms, many companies are relying on social media as a marketing tool. However, various businesses have struggled to effectively market themselves using these platforms. In many cases, many of these businesses lack either the understanding or the manpower to promote themselves using social media.

It is with respect to these and other general considerations that embodiments of the present disclosure have been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a method and system for providing notification of events. Specifically, embodiments disclosed herein describe a method and system for generating dynamic messages based on events and transmitting the dynamic messages to various users over a social networking platform. Embodiments include receiving product data and comparing the product data to a set of predefined trigger parameters. If it is determined that the product data satisfies one or more of the trigger parameters, a dynamic message is generated. In certain embodiments, the content of the dynamic message is based, at least in part, on the product data. The generated dynamic message is then automatically transmitted to a set of recipients over the social networking platform.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
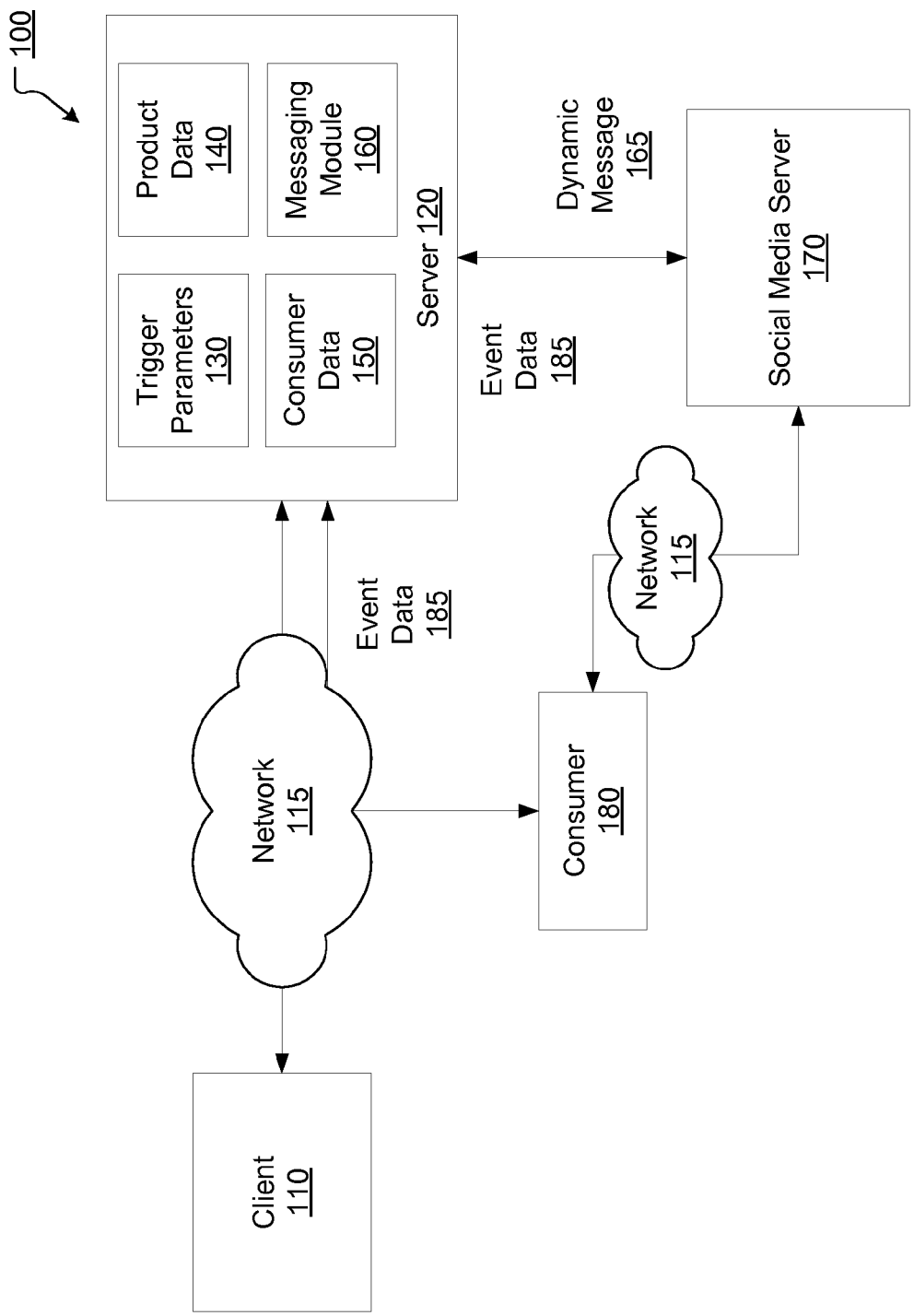
FIG. 1 illustrates a system for presenting event notifications according to one or more embodiments.

FIG. 1 illustrates a system 100 that may be used to implement various embodiments of the present disclosure. As shown in FIG. 1, the system 100 may include a client 110 that accesses a server 120 through a network connection 115. Although FIG. 1 shows one server 120, it is contemplated that the server 120 may be part of a server cluster (not shown). Additionally, although one client 110 is shown in FIG. 1, it is also contemplated that multiple clients may access the server 120 through the network 115 or that multiple clients may access different servers in the server cluster.

The server 120 may include one or more databases that store various types of information. Such information may include: (i) trigger parameters 130 that are used to determine whether a dynamic message 165 is to be generated based on product data 140; (ii) product data 140 that includes information about various products including product release dates, products on sale, product availability, inventory count of particular products, and sales of a particular product including past sales or forecasted sales; and (iii) consumer data 150 including contact information about consumers 180, past purchases by consumers 180, demographic information about consumers 180, subscription settings of consumers 180 and social media platforms accessed and used by the consumers 180.

In certain embodiments, the client 110 contacts or otherwise establishes a session with the server 120 over the network 115. Once the session is established, the client 110 may access or update the information contained in the one or more databases. For example, a business owner, or other user, may utilize the client 110 to access the server 120 and track or update product data 140, product listings, an online store front or other such data relating to the sale of a service or product or relating to an upcoming event. The client 110 may also enable the user to access or update consumer data 150 as well as to create, update, or edit trigger parameters 130. It is also contemplated that a user may access the messaging module and create one or more templates for a dynamic message 165 that will be sent to consumers 180 when one or more trigger parameters 130 are satisfied.

As will be explained in greater detail below, the server 120 may also be configured to automatically receive and track product data 140 and compare the received product data 140 to the set of trigger parameters 130. In certain embodiments, the server 120 may receive product data 140 from one or more additional servers or client devices (not shown). The server may also be configured to periodically (e.g., every minute, every hour, every 12 hours, every 24 hours etc.) compare received product data 140 to the trigger parameters 130. In another embodiment, the product data 140 may be compared to the trigger parameters 130 within a given period of time after the updated product data 140 is received.

As will be explained below, if it is determined that the product data 140 activates one or more trigger parameters 130, the messaging module 160 is configured to automatically generate a dynamic message 165 that is based, at least in part, on the product data 140. For example, if a particular product has been purchased by various consumers such that the number of products sold exceeds a threshold in a given amount of time, a dynamic message 165 may be generated that notifies various consumers 180 that the particular product is a popular item. Continuing with the example above, a custom message 165 may indicate that X number of a particular product has been sold within the last week, and as a result, a vendor is offering the particular product at a discount. In another embodiment, the dynamic message may indicate that a particular class or event has X number of seats available. In yet another embodiment, the dynamic message may indicate an upcoming event, appointment, due date and the like.

Regarding dynamic messages 165, it is contemplated that a user, utilizing client 110, may access the messaging module 160 and edit or create a dynamic message template that may be used to generate the dynamic message 165. As briefly discussed above, the dynamic message 165 may be an advertising message that includes information about an upcoming product release, an upcoming sale, product availability, inventory count, or information about a top selling product for a given duration of time. In another embodiment, the dynamic message 165 may be an offer message that contains a discount code, coupon or other promotion. In still yet another embodiment, the dynamic message 165 may be a combination message that includes an advertisement and an offer message. Although specific dynamic messages 165 are described, it is contemplated that various types of dynamic messages 165 may be generated and sent to various consumers 180 or posted on various social media environments as described herein.

In certain embodiments, the dynamic message 165 may be a text based message, a still picture, a video message, an audio message or a combination thereof. For example, a dynamic message 165 may include a picture of the particular product with text on or associated with the picture that indicates that the particular product featured in the picture is a top selling product.

In embodiments, consumer data 150 may also be compared with the trigger parameters 130. In such embodiments, if a determination is made that the consumer data 150 satisfies a trigger parameter 130, the messaging module 160 generates a dynamic message 165 that is based, at least in part, on the consumer data 150. It is also contemplated that the consumer data 150 may be combined with the product data 140 in order to generate a dynamic message 165 that is specific to consumers 180 that satisfy particular demographics. For example, if a particular product was a top selling product in a given geographic region or with a given age group, the dynamic message 165 would be generated with those specifics in mind. Additionally, because the message was generated with a particular demographic in mind, embodiments provide that the message would be delivered to only those consumers who satisfy the noted demographic. In embodiments, the consumer data 150 may also include information about one or more social networking platforms the consumer 180 accesses. Still further, the consumer data 150 may include information corresponding to where the consumer 180 has purchased particular products, or similar products, in the past.

Once this information is analyzed and the dynamic message 165 is generated, the server 120 may automatically transmit the dynamic message 165 to a social media server 170. When the dynamic message 165 is received as the social media server 170, the social media server 170 transmits the dynamic message 165 to one or more consumers 180 through a network 115. Although the server 120 and social media server 170 are shown as separate entities, it is contemplated that the server 120 and the social medial server 170 may be the same server or part of a server cluster.

In certain embodiments, the social media server 170 may be configured to analyze the dynamic message 165 to determine which consumers 180 are to receive the dynamic message 165. In certain embodiments, the dynamic message 165 is sent to consumers that have a pre-existing relationship with the user or business for which the dynamic message 165 is generated.

For example, if a dynamic message 165 is generated for Company A, the dynamic message 165 is sent to one or more consumers 180 that have purchased a product from Company A, or have purchased the same or similar product from Company A in the past. Although specific examples of a pre-existing relationship have been given, it is contemplated that a relationship may be established in additional ways, including referrals, requests received from consumers 180 that want to receive the dynamic messages, comments or pictures posted on one or more social media platforms by consumers 180 about a product provided by a particular company and the like. It is also contemplated that the consumer 180 may specify a frequency (e.g., once a week, once a month etc.) at which the dynamic message 165 from various businesses or individuals are received. In certain embodiments, this frequency parameter may be stored as part of the consumer data 150 and included as part of the dynamic message 165. In another embodiment, this information may be collected from the consumer 180 and stored by the social media server 170.

In certain embodiments, the server 120 may also be configured to interact with the social media server 170 and receive event notification 185 regarding which dynamic messages 165 have been accessed or otherwise acted upon by various consumers 180. For example, if a particular consumer received a dynamic message 165 on a social media platform about a limited number of seats available at an upcoming event, and subsequently forwarded the event to a friend or contact, reposted the event on a social media site, or purchased a seat at the event, such as, for example, by using a code, coupon, link, uniform resource locator (URL) or the like contained in the dynamic message 165, this event notification 185 may be received by the server 120, via the social media server 170, and stored in the product data 140 database.

In another embodiment, event notification 185 may be received directly from the consumer 180. For example, if a user receives a dynamic message 165 on a social media platform and subsequently selects a link contained in the dynamic message 165, the consumer 180 may be directed to a website or store front of the user or business owner for which the dynamic message 165 was generated. The server 120 may be configured to automatically determine, based on information received from the consumer 180, that the consumer 180 was directed to the store front or website via the dynamic message 165. Thus, the user or business owner may track the effectiveness of each of the dynamic messages 165 generated on his behalf.

Figure 2:
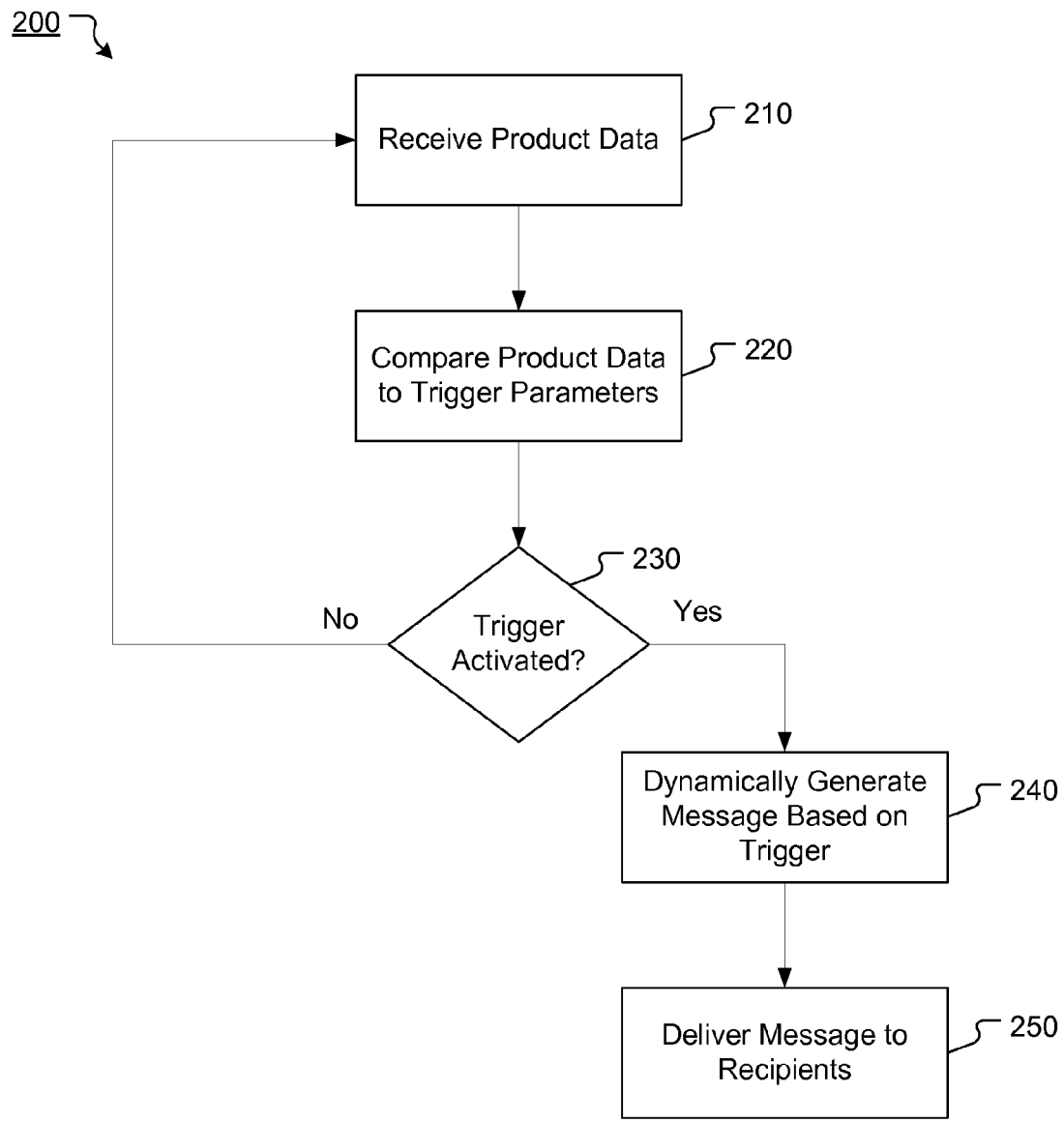
FIG. 2 illustrates a method for providing dynamically generated messages associated with an event according to one or more embodiments.
Figure 3:
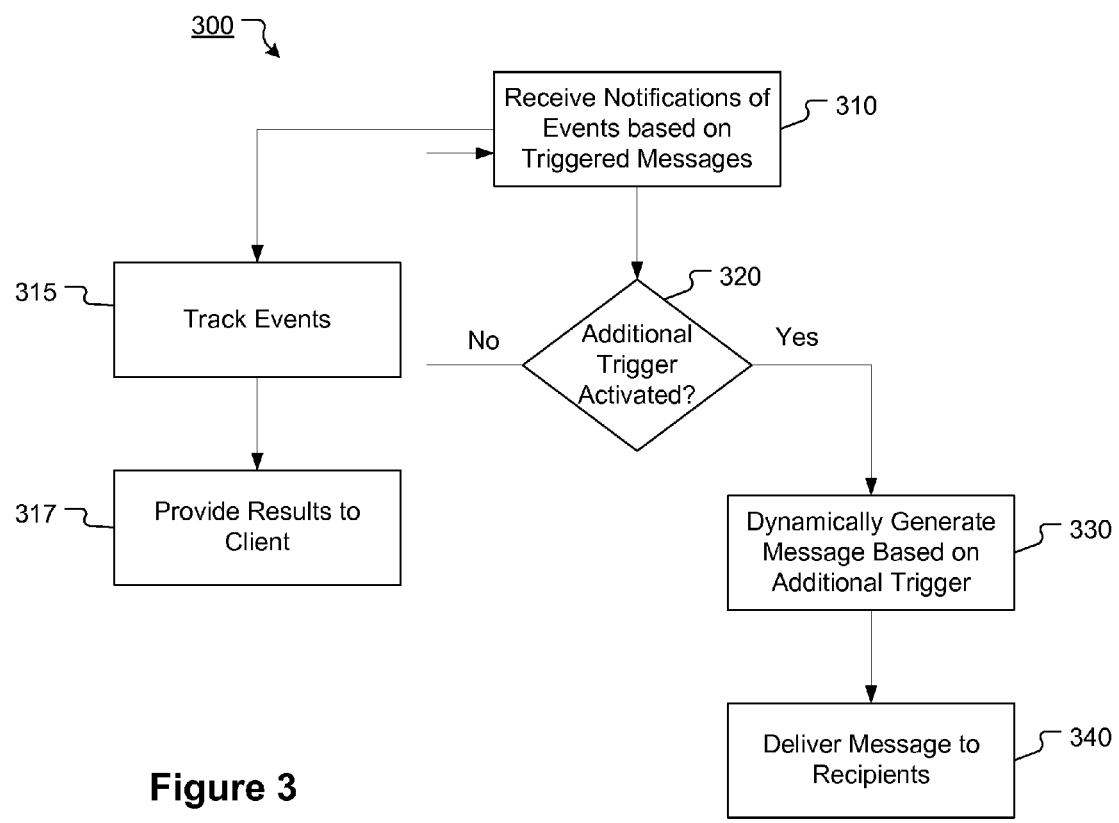
FIG. 3 illustrates a method for tracking events corresponding to the dynamically generated messages according to one or more embodiments.

FIGS. 2 and 3 illustrate methods 200 and 300 respectively, for generating dynamic messages and distributing those messages to various users over social networking platforms. In certain embodiments, one or more components of a system, such as system 100 (FIG. 1), may employ the methods 200 and 300 to track product data, generate dynamic messages based on the product data, and track events related to the dynamic messages.

Referring to FIG. 2, FIG. 2 illustrates a method 200 for providing dynamically generated messages associated with an event according to one or more embodiments. In certain embodiments, method 200 begins at operation 210 in which product data is received. In certain embodiments, the product data may be received by and stored in a remote database or an associated computing device that is accessible to a user over a network connection. The product data may include information about a particular product that is listed for sale by a user. Examples include products that are listed in an online store or store front, products for sale in a traditional brick and mortar retailer, events or services available for purchase, or combinations thereof. The product data may also include information about when the product was posted, the number of products sold, the remaining inventory, total sales, and the like.

In certain embodiments, a computing device that hosts the database of product data, such as, for example, server 120 (FIG. 1) is configured to automatically update the product data when new or updated data is received. For example, a server may be configured to receive sales data corresponding to a particular product and automatically update an "inventory" field and a "total sales" field associated with the particular product in the product data database. In another embodiment, a user may access the product data database and manually update fields associated with the particular product. As discussed above, it is also contemplated that the consumer data, such as, for example, contact information, subscription information (i.e., the frequency at which a consumer desires to receive dynamic messages via the social networking platform), and demographic information may be combined and analyzed with the product data.

Once the data is received, flow proceeds to operation 220 in which the product data is compared to one or more trigger parameters. In certain embodiments, the trigger parameters may be set by a user, seller or business owner. In another embodiment, the system may have a set of predetermined or predefined trigger parameters. In another embodiment, a computing device, such as server 120 (FIG. 1) that compares the product data with the trigger parameters may be configured to automatically generate suggested trigger parameters and either present the suggestions to the user or automatically utilize or implement the generated trigger parameters. Regardless of how the trigger parameters are generated, embodiments provide that a user may edit, delete or update existing trigger parameters and create custom trigger parameters.

In certain embodiments, the trigger parameters may include the following types of triggers: (i) Interval Triggers, (ii) Administrator Action Triggers, (iii) User Action Triggers, and (iv) aggregate action triggers. According to embodiments, Interval Triggers are trigger parameters that associate product data to a given time period. For example, these triggers may include parameters for: (a) top selling product(s) for a given time period, (b) top rated product(s) for a given time period (e.g. posted at a given interval, such as, for example, every year), (c) popular classes or categories of products for a given time period, (d) classes or categories of products for an upcoming time period, (e) a time period corresponding to an ongoing sale, (f) products that have received a "Like" or that have been "Pinned" (or given such other indication) above a threshold amount of times for a given time period, (g) the top new product for a given time period, (h) special events such as holidays and birthdays, (i) reminders for events including appointments, daily schedule, etc., (j) and a featured product or class of products.

Administrator Action Triggers are triggers that are satisfied when an administrator or other user (e.g., a business owner), performs an action associated with the product data. Such actions may include: (a) listing a new product, class, calendar event, sale and the like, (b) update the product data to indicate that a product is in stock, sold out or back in stock, (c) list a coupon or code associated with a particular item, and (d) post updated contact information for the business, blog posts, or announcements.

User Action Triggers are those that are satisfied based on a consumer's interaction with either a dynamic message or with an online store, store front, brick and mortar establishment, or venues. The interaction may include: (a) a purchase of an item or event that brings inventory (or available space) below a threshold, (b) a posted or communicated testimonial or referral, or (c) a gallery posting by a consumer.

Aggregate action triggers are triggers that are satisfied based on a combination of occurring events and/or a combination of triggers being satisfied—including a combination of the one or more triggers discussed above. For example, an aggregate action trigger may be triggered when a group of users purchase a group of items in a given time period. The combined action of the users causes the system to generate and transmit one or more notifications based on the aggregation of the events. Although specific categories and types of triggers are explicitly disclosed, it is contemplated that additional triggers may be created by a user and/or generated by the system.

In certain embodiments, each of the triggers discussed above may be arranged in a hierarchical manner. Accordingly, a first trigger parameter may have precedence over a second trigger parameter. The precedent parameter may occur when each of the trigger parameters are in the same category. Likewise, this precedence may exists between a first trigger parameter is a first category and a second trigger parameter in a second category. For example a trigger parameter that is classified as an Interval Trigger may have precedence over a trigger parameter that is classified as a User Action Trigger.

In another embodiment, a trigger parameter from a first category may have precedence over one or more trigger parameters from a second category, but may be required to defer to another trigger parameter from the second category. It is also contemplated that a first trigger may cause a second trigger parameter to be satisfied. In such cases, a determination may be made as to which trigger parameter takes precedence. In another embodiment, both trigger parameters may be used and a dynamic message (either joint or individual) may be generated. As discussed above, the content of the dynamic message is based, at least in part, on the product data.

Once the product data is compared to the trigger parameters, a determination 230 is made as to whether any of the trigger parameters are satisfied. If none of the trigger parameters are satisfied, flow proceeds back to operation 210 in which product data is once again received and the process repeats. If however, a determination is made that one or more trigger parameters are satisfied, flow proceeds to operation 240 in which a dynamic message is generated. In certain embodiments, the dynamic message is based, at least in part, on the product data. The dynamic message may include a video portion, an audio portion, an image portion, a text portion, or a combination thereof. The dynamic message may also include a timestamp as to when the message was generated as well as other identifiers such as, for example, to whom the message is to be delivered. For example, a dynamic message may be delivered to the general population of a social media platform, a list of persons that have a pre-existing relationship to the product or business for which the dynamic message was generated, a contact list, or a list of consumers that are manually or automatically selected based on various selection parameters.

It is also contemplated that the dynamic messages may be assigned a priority. Therefore, if a plurality of dynamic messages are generated and each dynamic message in the plurality is to be delivered to a particular consumer, a determination may be made (based on the subscription settings of the consumer) that the particular consumer only wants one notification a day. As such, a determination is made as to the message with the highest priority and that message is delivered to the particular consumer. In certain embodiments, the determination of priority may be based, at least in part, by the hierarchical standing of the trigger parameter that caused the dynamic message to be generated.

Once the dynamic message has been generated, flow proceeds to operation 250 in which the dynamic message is delivered to recipient consumers. In embodiments, the messages are delivered based on subscription settings of each user. The dynamic message may be delivered to a general population of a social media platform, a list of users that access the social medial platform, or a list of consumers that are manually selected.

Referring to FIG. 3, FIG. 3 illustrates a method 300 for tracking events that correspond to dynamically generated messages according to one or more embodiments. Method 300 begins at operation 310 in which notifications of events are received. In certain embodiments, the events correspond to a consumer's interaction with a dynamically generated message. The interaction may include a user commenting on the message, "liking" or "pinning" the message, clicking on an area of the message and the like. In another embodiment, an event may include a user purchasing a product advertised in the message, reserving a seat at an event described in the message or the like.

In certain embodiments, when the notifications of events are received, flow may proceed to operation 315 in which the events are tracked and provided 317 to a user via a client device such as, for example, client 110 (FIG. 1). Tracking the events enables a user or business owner to track the effectiveness of their dynamic messages. Based on this tracking data, a user may be able to identify the number of dynamic messages that were generated for each trigger parameter and product, as well as which messages were interacted with most by consumers. As a result, if the user is not satisfied with the data, the user can changes one or more trigger parameters that trigger generation of the message.

Along with tracking the events, flow may also proceed to operation 320 in which a determination is made as to whether the events cause a second trigger parameter to be satisfied. Satisfaction of a second trigger parameter may cause the generation of another dynamic message. In certain embodiments, the second trigger parameter may be in the same category or hierarchy as the initial trigger parameter that was satisfied (i.e., the trigger parameter of operation 220 in FIG. 2). In another embodiment, the second trigger parameter may be in a different category or different hierarchy.

If it is determined that an additional trigger parameter is not activated, flow proceeds to operation 310 in which the consumer integration with the dynamic messages is monitored. However, if it is determined in operation 320 that an additional trigger is satisfied, flow proceeds to operation 330 and a dynamic message is generated based on the second trigger. As with the dynamic message described above with respect to FIG. 2, this particular dynamic message may be prioritized based on the content of the message or by the place in the hierarchy of the trigger parameters that were satisfied.

Once the additional dynamic message has been generated, flow proceeds to operation 340 and the second dynamic message is delivered to recipients. As discussed above, the recipients may include a general population of a social media platform, consumers on one or more lists that have previous associations with a product or user, or consumers that are manually selected.

Figure 4:
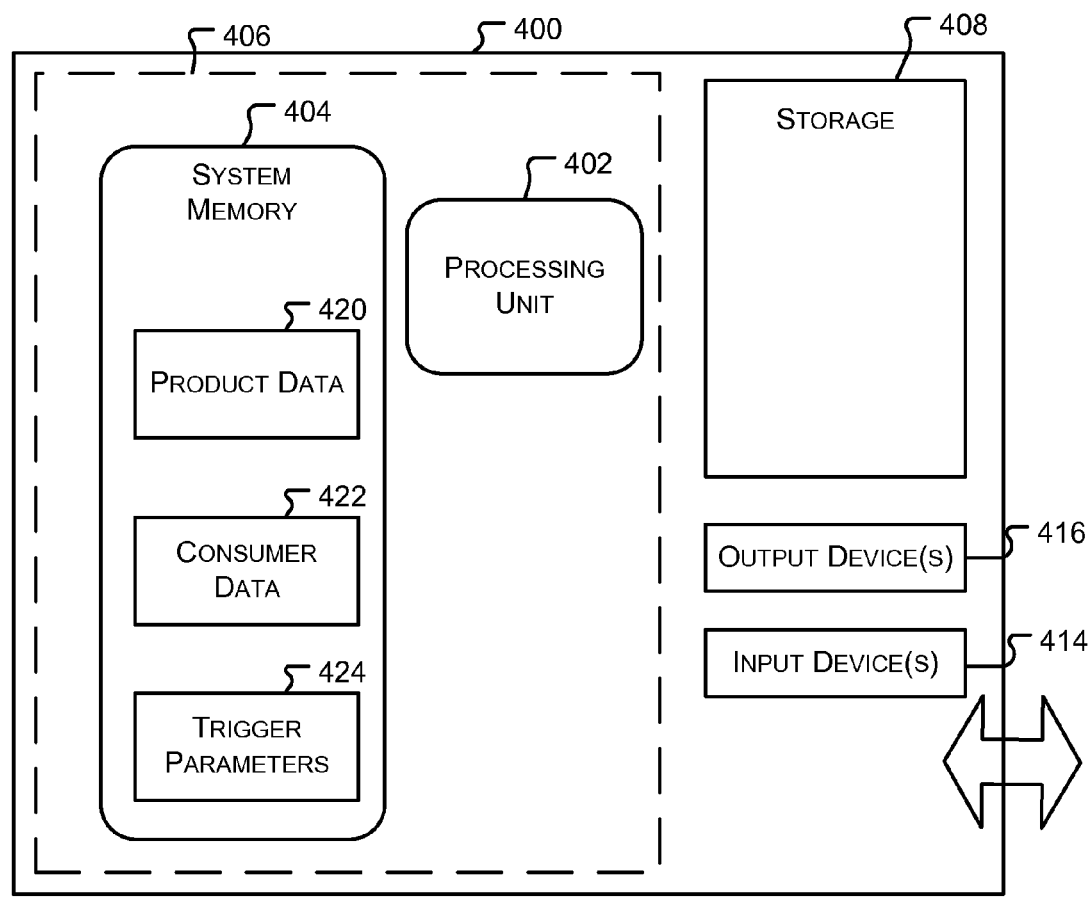
FIG. 4 illustrates a block diagram of a computing environment suitable for implementing embodiments disclosed herein.

FIG. 4 illustrates a general computer system 400, which can be used to implement the embodiments described herein. The computer system 400 is only one example of a computing environment and is not intended to suggest any limitation as to the scope of use or functionality of the computer and network architectures. Neither should the computer system 400 be interpreted as having any dependency or requirement relating to any one or combination of components illustrated in the example computer system 400. In embodiments, system 400 may be used as one or more components of system 100 described above with respect to FIG. 1.

In its most basic configuration, system 400 typically includes at least one processing unit 402 and memory 404. Depending on the exact configuration and type of computing device, memory 404 may be volatile (such as RAM), non-volatile (such as ROM, flash memory, etc.) or some combination. This most basic configuration is illustrated in FIG. 4 by dashed line 406. System memory 404 stores instructions or commands as well as product data 420, consumer data 422, and trigger parameters 424. Additional data, such as, for example, message templates, tracking data, and the like may be stored in a file storage system such as storage 408.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage, and non-removable storage 408 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computer system 400. Any such computer storage media may be part of computer system 400. Computer system 400 may also have input device(s) 414 such as a keyboard, a mouse, a pen, a sound input device, a touch input device, etc. In another embodiment, the computer system 400 may be coupled to a camera (not shown) that may be operative to record a user and capture motions and/or gestures made by a user. Output device(s) 416 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments disclosed may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 400 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A method for providing a notification of events, comprising:
    receiving product data about a product, the product data comprising one or more of: a release date, an availability of the product, past sales numbers of the product, and a forecasted number of sales of the product;
    tracking the product data to determine whether the product data triggers at least one trigger parameter from a set of trigger parameters defined by a provider of the product;
    when it is determined that the product data triggers at least one trigger parameter, automatically generating a dynamic message that includes information about the product and information corresponding to the product data that triggered the at least one trigger parameter; and
    automatically transmitting the dynamic message to a set of recipients that have an existing relationship with the provider of the product over a social networking medium.

2. The method of claim 1, wherein the trigger parameters correspond to one of: (i) an interval, (ii) an administrative action, and (iii) a user action.

3. The method of claim 1, further comprising receiving a notification of events that correspond to the dynamic message.

4. The method of claim 3, further comprising determining whether the events correspond to one or more additional trigger parameters.

5. The method of claim 4, further comprising automatically generating an additional dynamic message based, at least in part, on the events when the events correspond to the one or more additional trigger parameters.

6. The method of claim 4, further comprising automatically transmitting the additional dynamic message to the set of recipients.

7. The method of claim 6, wherein automatically transmitting the additional dynamic message comprises automatically transmitting the additional dynamic message to the set of recipients using the social networking medium.

8. The method of claim 1, wherein the set of trigger parameters are arranged in a hierarchical manner.

9. The method of claim 1, wherein the trigger parameters comprise one or more of: interval trigger parameters, administrator action trigger parameters, user action trigger parameters, and aggregate action trigger parameters.

10. A computer-readable storage device encoding computer executable instructions that, when executed by at least one processor, perform a method for providing a notification of events, comprising:
    receiving product data about a product, the product data comprising at least one of: sales numbers of the product for a given time period, an amount of the product remaining, a listing of a new product, and a calendared event;
    tracking the product data to determine whether the product data triggers at least one trigger parameter from a set of trigger parameters defined by a provider of the product;
    when it is determined that the product data triggers at least one trigger parameter, automatically generating a dynamic message that includes information about the product and information corresponding to the product data that triggered the at least one trigger parameter; and
    automatically transmitting the dynamic message to a set of recipients that have an existing relationship with the provider of the product over a social networking medium.

11. The computer-readable storage device of claim 10, further comprising instructions for receiving a notification of events that correspond to the dynamic message.

12. The computer-readable storage device of claim 11, further comprising instructions for determining whether the events correspond to one or more additional trigger parameters.

13. The computer-readable storage device of claim 12, further comprising instructions for generating an additional dynamic message based, at least in part, on the events when the events correspond to the one or more additional trigger parameters.

14. The computer-readable storage device of claim 13, further comprising instructions for automatically transmitting the additional dynamic message to the set of recipients.

15. The computer-readable storage device of claim 14, wherein automatically transmitting the additional dynamic message comprises automatically transmitting the additional dynamic message to the set of recipients using the social networking medium.

16. A computer system, comprising:
one or more processors; and
a memory coupled to the one or more processors, the memory for storing instructions that, when executed by the one or more processors, cause the one or more processors to perform a method for providing a notification of events, comprising:
receiving product data about a product, the product data comprising one or more of: a release date of the product, an availability of the product, past sales numbers associated with the product, and forecasted sales numbers of the product;
tracking the product data to determine whether the product data triggers at least one trigger parameter from a set of trigger parameters defined by a provider of the product;
when it is determined that the product data triggers at least one trigger parameter, automatically generating a dynamic message that includes information about the product and information corresponding to the product data that triggered the at least one trigger parameter;
determining a subset of recipients from a set of recipients that have an existing relationship with the provider of the product that will receive the dynamic message, wherein the determination is based, at least in part, on one or more criteria associated with each recipient from the set of recipients; and
automatically transmitting the dynamic message to the subset of recipients over a social networking medium.

17. The computer system of claim 16, further comprising instructions for receiving a notification of events that correspond to the dynamic message.

18. The computer system of claim 17, further comprising instructions for determining whether the events correspond to one or more additional trigger parameters.

19. The computer system of claim 18, further comprising instructions for generating an additional dynamic message based, at least in part, on the events when the events correspond to the one or more additional trigger parameters.

20. The computer system of claim 16, wherein the set of trigger parameters are categorically and hierarchically arranged.

* * * * *